United States Patent
Lee et al.

(10) Patent No.: US 10,779,211 B2
(45) Date of Patent: Sep. 15, 2020

(54) METHOD AND APPARATUS FOR ACQUIRING SYSTEM INFORMATION

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 132 days.

(21) Appl. No.: 16/089,342

(22) PCT Filed: Mar. 28, 2017

(86) PCT No.: PCT/KR2017/003326
§ 371 (c)(1),
(2) Date: Sep. 27, 2018

(87) PCT Pub. No.: WO2017/171355
PCT Pub. Date: Oct. 5, 2017

(65) Prior Publication Data
US 2019/0116533 A1 Apr. 18, 2019

Related U.S. Application Data

(60) Provisional application No. 62/314,348, filed on Mar. 28, 2016.

(51) Int. Cl.
*H04W 88/02* (2009.01)
*H04W 36/08* (2009.01)
(Continued)

(52) U.S. Cl.
CPC .............. *H04W 36/08* (2013.01); *H04W 8/08* (2013.01); *H04W 16/32* (2013.01); *H04W 48/08* (2013.01);
(Continued)

(58) Field of Classification Search
None
See application file for complete search history.

(56) References Cited

U.S. PATENT DOCUMENTS

2012/0315888 A1* 12/2012 Bray ................. G08C 17/02
455/420
2016/0174124 A1* 6/2016 Basu Mallick ..... H04W 74/006
370/331
(Continued)

FOREIGN PATENT DOCUMENTS

KR 1020080046347 5/2008
KR 1020100050219 5/2010
(Continued)

OTHER PUBLICATIONS

PCT International Application No. PCT/KR2017/003326, International Search Report dated Jun. 26, 2017, 4 pages.

*Primary Examiner* — Brandon M Renner
(74) *Attorney, Agent, or Firm* — Lee Hong Degerman Kang Waimey

(57) ABSTRACT

Provided are a method for acquiring system information by a terminal in a wireless communication system and an apparatus for supporting the same. The method may comprise the steps of: acquiring system information for a first area and system information for a second area belonging to the first area; entering a third area; acquiring system information for the third area; and determining whether the first area has been changed, on the basis of an identifier included in the system information for the second area and an identifier included in the system information for the third area.

9 Claims, 12 Drawing Sheets

(51) Int. Cl.
*H04W 16/32* (2009.01)
*H04W 48/16* (2009.01)
*H04W 48/12* (2009.01)
*H04W 48/08* (2009.01)
*H04W 8/08* (2009.01)
*H04W 68/02* (2009.01)
*H04W 92/20* (2009.01)
*H04W 36/32* (2009.01)
*H04W 88/08* (2009.01)
*H04W 80/02* (2009.01)

(52) U.S. Cl.
CPC ........... *H04W 48/12* (2013.01); *H04W 48/16* (2013.01); *H04W 68/02* (2013.01); *H04W 92/20* (2013.01); *H04W 36/32* (2013.01); *H04W 80/02* (2013.01); *H04W 88/085* (2013.01)

(56) References Cited

U.S. PATENT DOCUMENTS

| | | | |
|---|---|---|---|
| 2016/0323784 A1* | 11/2016 | Ma | H04W 76/10 |
| 2017/0238292 A1* | 8/2017 | Rico Alvarino | H04W 4/70 370/329 |
| 2018/0014218 A1* | 1/2018 | Kubota | H04W 56/001 |
| 2018/0103437 A1* | 4/2018 | Kommi | H04W 52/327 |
| 2019/0357170 A1* | 11/2019 | Liu | H04W 68/025 |
| 2020/0008103 A1* | 1/2020 | Lin | H04W 76/27 |
| 2020/0022109 A1* | 1/2020 | Wang | H04W 68/005 |

FOREIGN PATENT DOCUMENTS

| | | |
|---|---|---|
| KR | 1020100137536 | 12/2010 |
| KR | 1020120109511 | 10/2012 |
| KR | 1020150008800 | 1/2015 |

* cited by examiner

METHOD AND APPARATUS FOR ACQUIRING SYSTEM INFORMATION

CROSS-REFERENCE TO RELATED APPLICATIONS

This application is the National Stage filing under 35 U.S.C. 371 of International Application No. PCT/KR2017/003326, filed on Mar. 28, 2017, which claims the benefit of U.S. Provisional Applications No. 62/314,348, filed on Mar. 28, 2016, the contents of which are all hereby incorporated by reference herein in their entirety.

BACKGROUND OF THE INVENTION

Field of the Invention

The present invention relates to a wireless communication system and, more particularly, to a method for a user equipment (UE) to acquire system information in a scenario where base stations (BSs) are hierarchically deployed, and an apparatus for supporting the same.

Related Art

In order to meet the demand for wireless data traffic soring since the 4th generation (4G) communication system came to the market, there are ongoing efforts to develop enhanced 5th generation (5G) communication systems or pre-5G communication systems. For the reasons, the 5G communication system or pre-5G communication system is called the beyond 4G network communication system or post long-term evolution (LTE) system.

In order to accomplish a higher data transfer rate, the 5G communication system considers implementation at a super-high frequency (mmWave) band (e.g., such as a 60GHz band). In order to obviate a path loss of a radio wave and increase a delivery distance of a radio wave at the super-high frequency band, various techniques such as a beamforming, a massive MIMO, a full dimensional MIMO (FD-MIMO), an array antenna, an analog beam-forming, and a large scale antenna are discussed in the 5G communication system.

Additionally, for an improvement in network of the 5G communication system, technical developments are made in an advanced small cell, a cloud radio access network (cloud RAN), an ultra-dense network, a device to device (D2D) communication, a wireless backhaul, a moving network, a cooperative communication, coordinated multi-points (CoMP), a reception interference cancellation, and the like.

Besides, in the 5G communication system, a hybrid FSK and QAM modulation (FQAM) and a sliding window superposition coding (SWSC) are developed as advanced coding modulation (ACM) schemes, and a filter bank multi carrier (FBMC), a non orthogonal multiple access (NOMA), and a sparse code multiple access (SCMA) are also developed as advanced access techniques.

SUMMARY OF THE INVENTION

When base stations (BSs) are hierarchically deployed, a user equipment (UE) may need to acquire system information from a plurality of areas. Therefore, it is necessary to propose a new improved method for acquiring system information.

According to an embodiment, there is provided a method for acquiring, by a UE, system information in a wireless communication system. The method may include: acquiring system information for a first area and system information for a second area belonging to the first area; entering a third area; acquiring system information for the third area; and determining whether the first area is changed based on an identifier included in the system information for the second area and an identifier included in the system information for the third area.

The method may further include acquiring system information for the changed first area when it is determined that the first area is changed. The first area may be an area covered by a central unit (CU) of a first next-generation NodeB (gNB), the changed first area may be an area covered by a CU of a second gNB, the second area may be an area covered by a distributed unit (DU) of the first gNB, and the third area may be an area covered by a DU of the second gNB. The CU may perform an upper-layer function of a BS, and the DU may perform a lower-layer function of the BS.

The method may further include keeping the system information for the first area when it is determined that the first area is not changed. The first area may be an area covered by a CU of a first gNB, and the second area and the third area may be areas covered by a DU of the first gNB.

The system information for the first area and the system information for the second area are broadcast via different time resources or different frequency resources.

The system information for the first area and the system information for the second area belonging to the first area may be acquired from the second area.

The UE may enter the third area by any one of handover, redirection, and cell reselection.

The method may further include determining whether the system information for the first area or the system information for the second area is changed based on a Value Tag.

The method may further include determining whether to newly acquire the system information for the first area or the system information for the second area based on an indication comprised in a paging message.

According to another embodiment, there is provided a UE for acquiring system information in a wireless communication system. The UE may include: a memory; a transceiver; and a processor to connect the memory and the transceiver, wherein the processor may be configured to: acquire system information for a first area and system information for a second area belonging to the first area; enter a third area; acquire system information for the third area; and determine whether the first area is changed based on an identifier comprised in the system information for the second area and an identifier comprised in the system information for the third area.

The processor may be configured to acquire system information for the changed first area when it is determined that the first area is changed. The first area may be an area covered by a central unit (CU) of a first next-generation NodeB (gNB), the changed first area may be an area covered by a CU of a second gNB, the second area may be an area covered by a distributed unit (DU) of the first gNB, and the third area may be an area covered by a DU of the second gNB. The CU may perform an upper-layer function of a BS, and the DU may perform a lower-layer function of the BS.

A UE may not acquire overlapping system information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE. 5G is an evolution of the LTE-A.

For clarity, the following description will focus on LTE-A. However, technical features of the present invention are not limited thereto.

Figure 1:
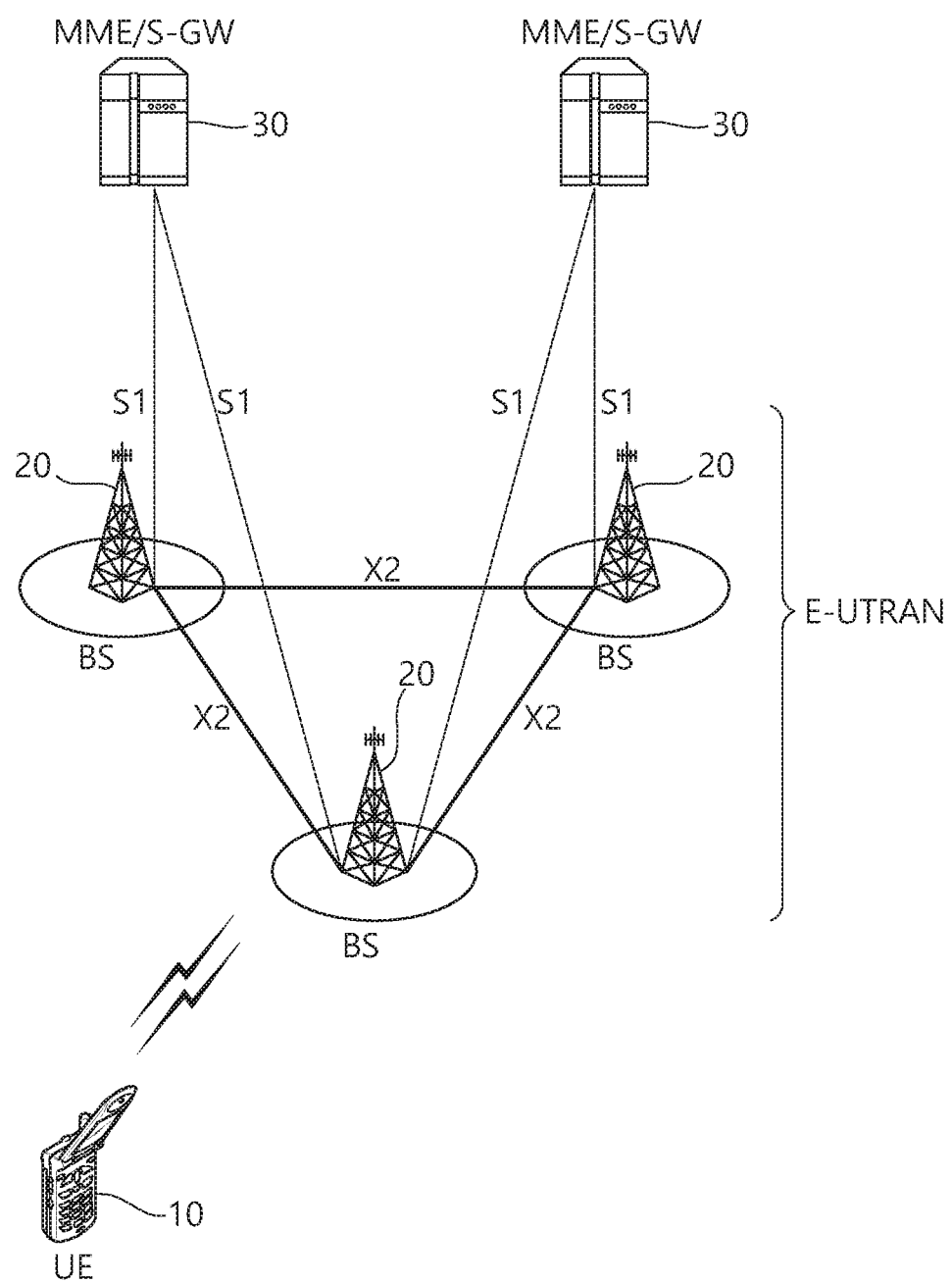
FIG. 1 shows LTE system architecture.

FIG. 1 shows LTE system architecture. The communication network is widely deployed to provide a variety of communication services such as voice over internet protocol (VoIP) through IMS and packet data.

Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), a base transceiver system (BTS), an access point, etc. One eNB 20 may be deployed per cell. There are one or more cells within the coverage of the eNB 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Hereinafter, a downlink (DL) denotes communication from the eNB 20 to the UE 10, and an uplink (UL) denotes communication from the UE 10 to the eNB 20. In the DL, a transmitter may be a part of the eNB 20, and a receiver may be a part of the UE 10. In the UL, the transmitter may be a part of the UE 10, and the receiver may be a part of the eNB 20.

The EPC includes a mobility management entity (MME) which is in charge of control plane functions, and a system architecture evolution (SAE) gateway (S-GW) which is in charge of user plane functions. The MME/S-GW 30 may be positioned at the end of the network and connected to an external network. The MME has UE access information or UE capability information, and such information may be primarily used in UE mobility management. The S-GW is a gateway of which an endpoint is an E-UTRAN. The MME/S-GW 30 provides an end point of a session and mobility management function for the UE 10. The EPC may further include a packet data network (PDN) gateway (PDN-GW). The PDN-GW is a gateway of which an endpoint is a PDN.

The MME provides various functions including non-access stratum (NAS) signaling to eNBs 20, NAS signaling security, access stratum (AS) security control, Inter core network (CN) node signaling for mobility between 3GPP access networks, idle mode UE reachability (including control and execution of paging retransmission), tracking area list management (for UE in idle and active mode), P-GW and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on APN-AMBR. For clarity MME/S-GW 30 will be referred to herein simply as a "gateway," but it is understood that this entity includes both the MME and S-GW.

Interfaces for transmitting user traffic or control traffic may be used. The UE 10 and the eNB 20 are connected by means of a Uu interface. The eNBs 20 are interconnected by means of an X2 interface. Neighboring eNBs may have a meshed network structure that has the X2 interface. The eNBs 20 are connected to the EPC by means of an S1 interface. The eNBs 20 are connected to the MME by means of an S1-MME interface, and are connected to the S-GW by means of S 1-U interface. The Si interface supports a many-to-many relation between the eNB 20 and the MME/S-GW.

The eNB 20 may perform functions of selection for gateway 30, routing toward the gateway 30 during a radio resource control (RRC) activation, scheduling and transmitting of paging messages, scheduling and transmitting of broadcast channel (BCH) information, dynamic allocation of resources to the UEs 10 in both UL and DL, configuration and provisioning of eNB measurements, radio bearer control, radio admission control (RAC), and connection mobility control in LTE_ACTIVE state. In the EPC, and as noted above, gateway 30 may perform functions of paging origination, LTE_IDLE state management, ciphering of the user plane, SAE bearer control, and ciphering and integrity protection of NAS signaling.

Figure 2:
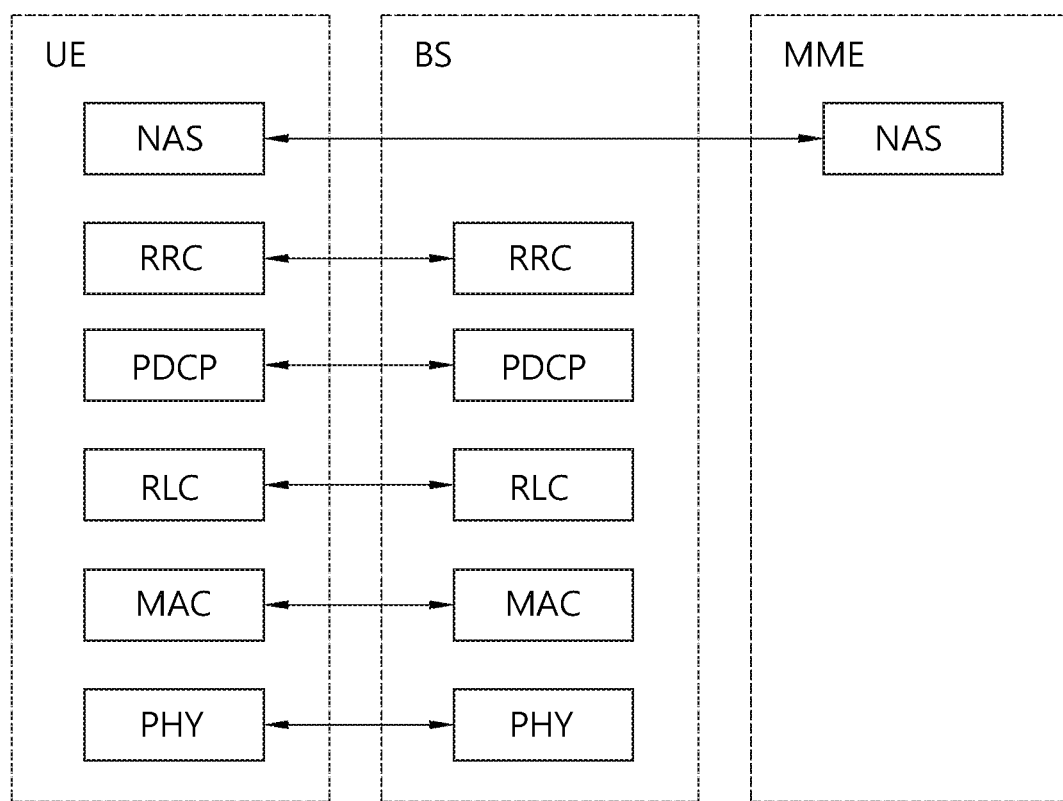
FIG. 2 shows a control plane of a radio interface protocol of an LTE system.
Figure 3:
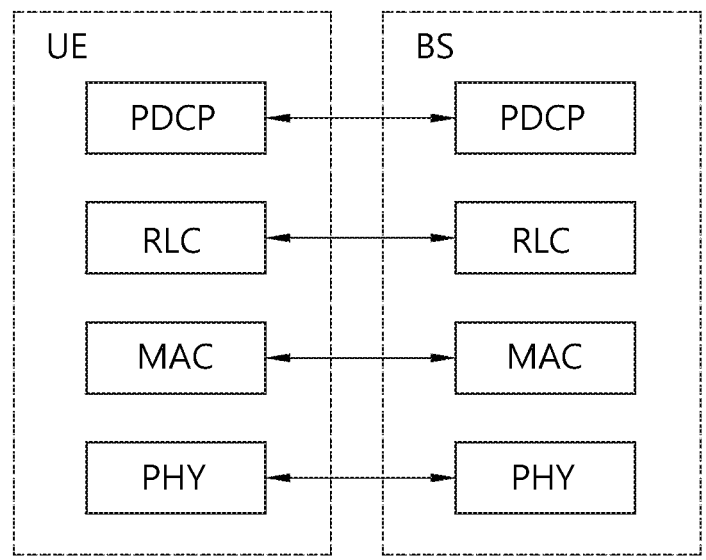
FIG. 3 shows a user plane of a radio interface protocol of an LTE system.

FIG. 2 shows a control plane of a radio interface protocol of an LTE system. FIG. 3 shows a user plane of a radio interface protocol of an LTE system.

Layers of a radio interface protocol between the UE and the E-UTRAN may be classified into a first layer (L1), a second layer (L2), and a third layer (L3) based on the lower three layers of the open system interconnection (OSI) model that is well-known in the communication system. The radio interface protocol between the UE and the E-UTRAN may be horizontally divided into a physical layer, a data link layer, and a network layer, and may be vertically divided into a control plane (C-plane) which is a protocol stack for control signal transmission and a user plane (U-plane) which is a protocol stack for data information transmission. The layers of the radio interface protocol exist in pairs at the UE and the E-UTRAN, and are in charge of data transmission of the Uu interface.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel A physical channel is mapped to the transport channel. Data is transferred between the MAC layer and the PHY layer through the transport channel Between different PHY layers, i.e., a PHY layer of a transmitter and a PHY layer of a receiver, data is transferred through the physical channel using radio resources. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH may carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ acknowledgement (ACK)/non-acknowledgement (NACK) signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

A physical channel consists of a plurality of subframes in time domain and a plurality of subcarriers in frequency domain. One subframe consists of a plurality of symbols in the time domain. One subframe consists of a plurality of resource blocks (RBs). One RB consists of a plurality of symbols and a plurality of subcarriers. In addition, each subframe may use specific subcarriers of specific symbols of a corresponding subframe for a PDCCH. For example, a first symbol of the subframe may be used for the PDCCH. The PDCCH carries dynamic allocated resources, such as a physical resource block (PRB) and modulation and coding scheme (MCS). A transmission time interval (TTI) which is a unit time for data transmission may be equal to a length of one subframe. The length of one subframe may be 1 ms.

The transport channel is classified into a common transport channel and a dedicated transport channel according to whether the channel is shared or not. A DL transport channel for transmitting data from the network to the UE includes a broadcast channel (BCH) for transmitting system information, a paging channel (PCH) for transmitting a paging message, a DL-SCH for transmitting user traffic or control signals, etc. The DL-SCH supports HARQ, dynamic link adaptation by varying the modulation, coding and transmit power, and both dynamic and semi-static resource allocation. The DL-SCH also may enable broadcast in the entire cell and the use of beamforming. The system information carries one or more system information blocks. All system information blocks may be transmitted with the same periodicity. Traffic or control signals of a multimedia broadcast/multicast service (MBMS) may be transmitted through the DL-SCH or a multicast channel (MCH).

A UL transport channel for transmitting data from the UE to the network includes a random access channel (RACH) for transmitting an initial control message, a UL-SCH for transmitting user traffic or control signals, etc. The UL-SCH supports HARQ and dynamic link adaptation by varying the transmit power and potentially modulation and coding. The UL-SCH also may enable the use of beamforming. The RACH is normally used for initial access to a cell.

A MAC layer belongs to the L2. The MAC layer provides services to a radio link control (RLC) layer, which is a higher layer of the MAC layer, via a logical channel The MAC layer provides a function of mapping multiple logical channels to multiple transport channels. The MAC layer also provides a function of logical channel multiplexing by mapping multiple logical channels to a single transport channel A MAC sublayer provides data transfer services on logical channels.

The logical channels are classified into control channels for transferring control plane information and traffic channels for transferring user plane information, according to a type of transmitted information. That is, a set of logical channel types is defined for different data transfer services offered by the MAC layer. The logical channels are located above the transport channel, and are mapped to the transport channels.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting MBMS control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both uplink and downlink. The MTCH is a point-to-multipoint downlink channel for transmitting traffic data from the network to the UE.

Uplink connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RLC layer belongs to the L2. The RLC layer provides a function of adjusting a size of data, so as to be suitable for a lower layer to transmit the data, by concatenating and segmenting the data received from an upper layer in a radio section. In addition, to ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides a retransmission function through an automatic repeat request (ARQ) for reliable data transmission. Meanwhile, a function of the RLC layer may be implemented with a functional block inside the MAC layer. In this case, the RLC layer may not exist.

A packet data convergence protocol (PDCP) layer belongs to the L2. The PDCP layer provides a function of header compression function that reduces unnecessary control information such that data being transmitted by employing IP packets, such as IPv4 or IPv6, can be efficiently transmitted over a radio interface that has a relatively small bandwidth. The header compression increases transmission efficiency in the radio section by transmitting only necessary information in a header of the data. In addition, the PDCP layer provides a function of security. The function of security includes ciphering which prevents inspection of third parties, and integrity protection which prevents data manipulation of third parties.

A radio resource control (RRC) layer belongs to the L3. The RLC layer is located at the lowest portion of the L3, and is only defined in the control plane. The RRC layer takes a role of controlling a radio resource between the UE and the network. For this, the UE and the network exchange an RRC message through the RRC layer. The RRC layer controls logical channels, transport channels, and physical channels in relation to the configuration, reconfiguration, and release of RBs. An RB is a logical path provided by the L1 and L2 for data delivery between the UE and the network. That is, the RB signifies a service provided the L2 for data transmission between the UE and E-UTRAN. The configuration of the RB implies a process for specifying a radio protocol layer and channel properties to provide a particular service and for determining respective detailed parameters and operations. The RB is classified into two types, i.e., a signaling RB (SRB) and a data RB (DRB). The SRB is used as a path for transmitting an RRC message in the control plane. The DRB is used as a path for transmitting user data in the user plane.

A Non-Access Stratum (NAS) layer placed over the RRC layer performs functions, such as session management and mobility management.

Referring to FIG. 2, the RLC and MAC layers (terminated in the eNB on the network side) may perform functions such as scheduling, automatic repeat request (ARQ), and hybrid automatic repeat request (HARQ). The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

Referring to FIG. 3, the RLC and MAC layers (terminated in the eNB on the network side) may perform the same functions for the control plane. The PDCP layer (terminated in the eNB on the network side) may perform the user plane functions such as header compression, integrity protection, and ciphering.

Hereinafter, system information will be described.

Figure 4:
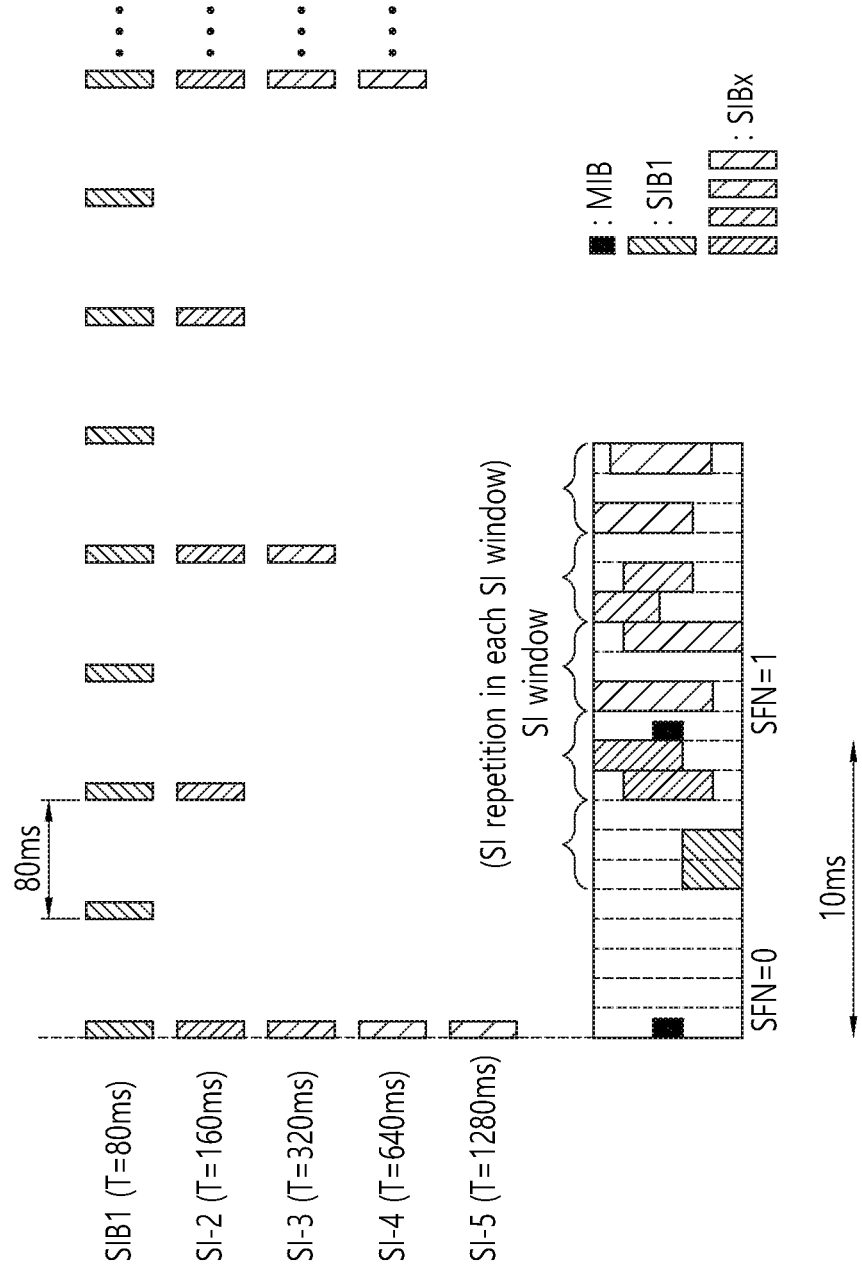
FIG. 4 shows an example of transmitting a master information block (MIB), system information block1 (SIB1), and other SIBs.

FIG. 4 shows an example of transmitting a master information block (MIB), system information block1 (SIB1), and other SIBs.

An LTE cell broadcasts basic parameters necessary for the operation of an IDLE_MODE UE and a CONNECTED_MODE UE via a plurality of separate information blocks. Examples of information blocks include an MIB, SIB1, SIB2, and other SIBs (SIBn).

The MIB includes the most essential parameters needed for a UE to access a cell. Referring to FIG. 4, an MIB message is broadcast through a BCH according to a periodicity of 40 ms, and MIB transmission is repeated in all radio frames within the periodicity of 40 ms. The UE receives an SIB message using the parameters received via the MIB.

There are different types of SIBs.

SIB1 includes pieces of information associated with cell access, and particularly includes scheduling information on other SIBs (SIB2 to SIBn) than SIB1. SIBs having the same transmission periodicity among the SIBs other than SIB1 are transferred via the same system information (SI) message. Thus, scheduling information includes a mapping relationship between each SIB and an SI message. An SI message is transmitted within an SI window in a time domain, and each SI message is associated with one SI window. Since SI windows for different pieces of SI do not overlap, only one SI message is transmitted within an SI window. Thus, scheduling information includes the duration of an SI window and an SI transmission periodicity. Time/frequency for transmitting an SI message is determined by dynamic scheduling by a BS. SIB1 is broadcast through a downlink shared channel (DL SCH) according to a periodicity of eight radio frames (that is, 80-ms periodicity), and SIB1 is repeatedly retransmitted on a fifth subframe of an SFN-mod-2 radio frame within the 80-ms periodicity.

SIB2 includes necessary information for a UE to access a cell. SIB2 includes information on an uplink cell bandwidth, a random access parameter, and an uplink power control parameter.

SIB3 includes cell reselection information. SIB4 includes frequency information on a serving cell and intra-frequency information on a neighboring cell for cell reselection. SIB5 includes frequency information on a different E-UTRA and inter-frequency information on a neighboring cell for cell reselection. SIB6 includes frequency information on a UTRA and information on a UTRA neighboring cell for cell reselection. SIB7 includes frequency information on a GERAN for cell reselection. SIB8 includes information on a neighboring cell.

SIBS includes a Home eNodeB (HeNB) identifier (ID). SIB10 to SIB12 include a public warning message, for example, for earthquake warning. SIB14 is used to support enhanced access barring and controls UEs to access a cell. SIB15 includes information needed to receive an MBMS at contiguous carrier frequencies. SIB16 include GPS time and coordinated universal time (UTC)-related information. SIB17 includes RAN auxiliary information.

Not all SIBs are always required to be present. For example, SIBS is not needed in a mode where a wireless carrier establishes an HeNB, while SIB13 is not needed if a cell provides no MBMS.

Hereinafter, a 5G RAN Deployment Scenario will be Described.

A 5G RAN may be classified into a 'non-centralized deployment' scenario, a 'co-sited deployment with E-UTRA' scenario, and a 'centralized deployment' scenario according to a shape of deploying a function of a base station in a central unit and a distributed unit and according to whether it coexists with a 4G base station. In this specification, the 5G RAN, a gNB, a next generation node B, a new RAN, and a new radio base station (NR BS) may imply a newly defined base station for 5G. In addition, a basic function to be supported by the 5G RAN may be defined by Table 1.

Figure 6:
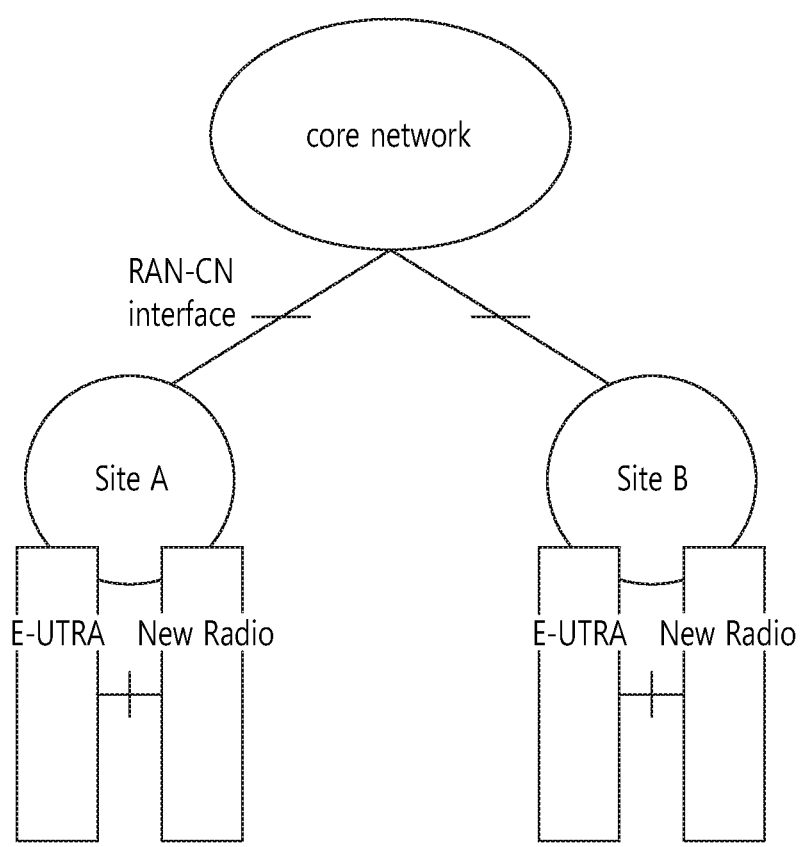
FIG. 6 shows a 'co-sited deployment with E-UTRA' scenario.

FIG. 6 shows a 'co-sited deployment with E-UTRA' scenario.

Referring to FIG. 6, a 5G transmission scheme (e.g., new radio) and a 4G transmission scheme (e.g., E-UTRAN) may be used together in one co-sited deployment. The co-sited deployment scenario may be suitable for an urban macro environment. When a gNB configuration is controlled by utilizing load balancing and multi-connectivity, the co-sited deployment scenario can utilize all frequency resources allocated to 4G/5G, and can extend cell coverage for a subscriber located at a cell boundary by using a low frequency.

Figure 7:
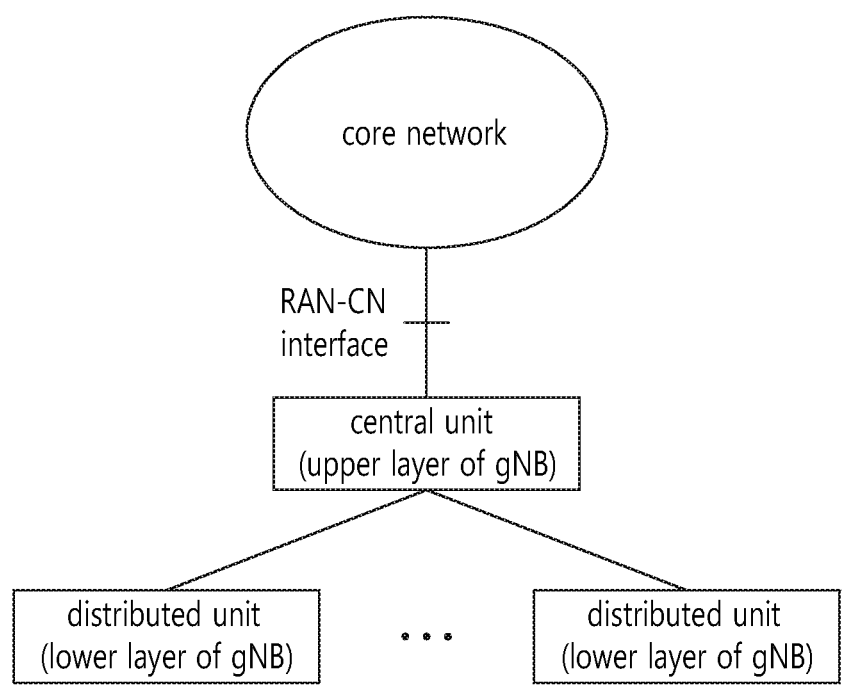
FIG. 7 shows a centralized deployment scenario.

FIG. 7 shows a centralized deployment scenario.

Referring to FIG. 7, a gNB may be split into a CU and a DU. That is, the gNB may operate by being split in a layered manner The CU may perform a function of upper layers of the gNB, and the DU may perform a function of lower layers of the gNB. The centralized deployment scenario may be classified into a high performance transport type and a low performance transport type according to transmission capacity and delay characteristics of a transport device which connects the CU and the DU.

When the transport requires high performance, the CU accommodates many functions from the upper layer to the lower layer, whereas the DU accommodates only relatively a small number of lower layers in comparison with the CU. Therefore, processing of the CU may be overloaded, and it may be difficult to satisfy a requirement for transmission capacity, delay, and synchronization of the transport device. For example, when most of layers (RRC layers to physical layers) are deployed in the CU and only an RF function is deployed to the DU, it is estimated that a transmission band of the transport device is 157 Gbps and a maximum delay is 250 us, and thus the transport device requires an optical

TABLE 1

| Function group similar to E-UTRAN | |
|---|---|
| Function similar to E-UTRAN | Synchronization, Paging, Connection, Handover, Load balancing, Radio access network sharing, etc. |
| First new RAN function group | |
| Support network Slicing | Capable of supporting core network slice of RAN |
| Tight Interworking | Dual connectivity, Data flow aggregation function between 4G and 5G eNBs |
| Multi-connectivity | Function of simultaneously connecting one New RAN node and multiple New RAN nodes through Data flow combination |
| Support multi-RAT handover | Handover function through new direct interface (xX) between eLTE eNB and gNB |
| Second new RAN function group | |
| UE Inactive mode | Function enabling direct connection when new traffic occurs in UE in a state where a radio access resource is released and a wired connection (gNB-NGC) is established |
| Direct service | D2D improvement function |
| Non-3GPP Interworking | Interworking function between Non-3GPP(e.g., WLAN) and NR |
| Support Inter-RAT handover through Core | Support handover between E-UTRA and NR through Core |

Figure 5:
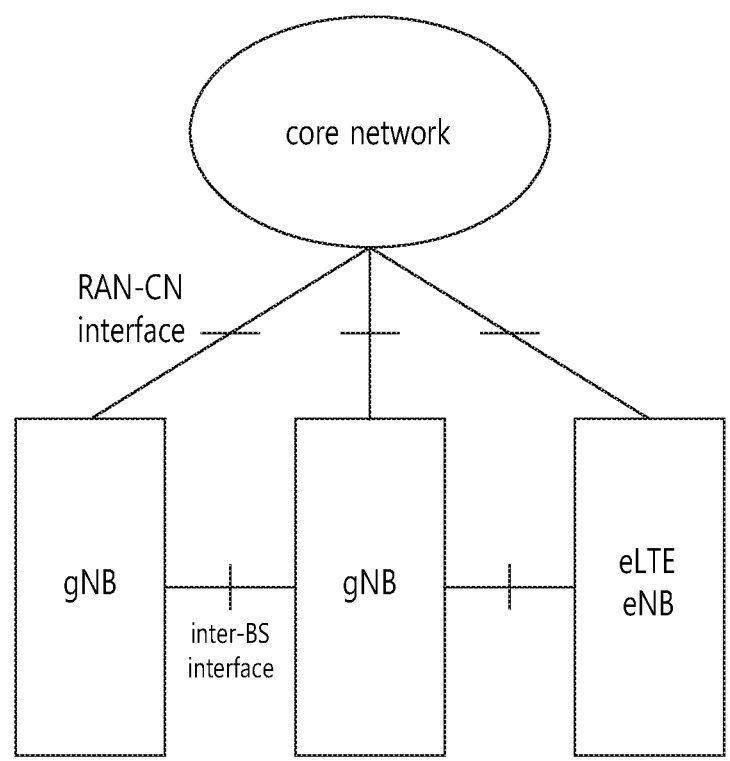
FIG. 5 shows a non-centralized deployment scenario.

FIG. 5 shows a non-centralized deployment scenario.

Referring to FIG. 5, a gNB may be configured in a horizontal manner without being split in a layered manner such as a CU and a DU. In this case, a protocol stack of a full set may be supported in each gNB. The non-centralized deployment scenario may be suitable for a macro cell or indoor hotspot environment. The gNB may be directly connected to another gNB or an eLTE eNB through an inter-BS interface. The gNB may be directly connected to a core network through an RAN-CN interface.

network with high capacity and low delay. On the other hand, since a transmission delay is short, when an optimal scheduling scheme is used, there is an advantage in that cooperative communication (e.g., CoMP) between gNBs can be more easily realized.

When the transport requires low performance, the CU accommodates an upper layer protocol function having a slightly low processing load, and thus there is room in the transmission capacity and delay of the transport device. For example, when only at least the upper layer (RRC layer) is deployed in the CU and all lower layers (PDCP layer to RF) lower than that are deployed in the DU, it is estimated that the transmission band of the transport device is 3 to 4 Gbps and the maximum delay is 10 ms. Therefore, there is room in the transmission band and the delay in comparison with the transport requiring high performance Hereinafter, Network Slicing will be Described.

Major distinctive features of 5G systems are flexibility and adaptability to network functions and services. One key concept for achieving flexibility is network slicing. Using network slicing makes it possible to efficiently support various requirements for a network.

Network slicing means that one physical network is divided into a plurality of logical networks including particular network functions to provide various services of different characteristics. Here, isolation between different network slices may be required so that a service provided by one network slice does not affect a service provided by another network slice.

Generally, a service for a user may be provided by one network slice operated by a network operator. However, a particular user may simultaneously connect one or more network slices in order to use services of various characteristics, such as mobile broadband (MBB) and critical communication. When the particular user attempts to connect to one or more networks slice at the same time, the network operator needs to prevent signaling procedures from overlapping.

Figure 8:
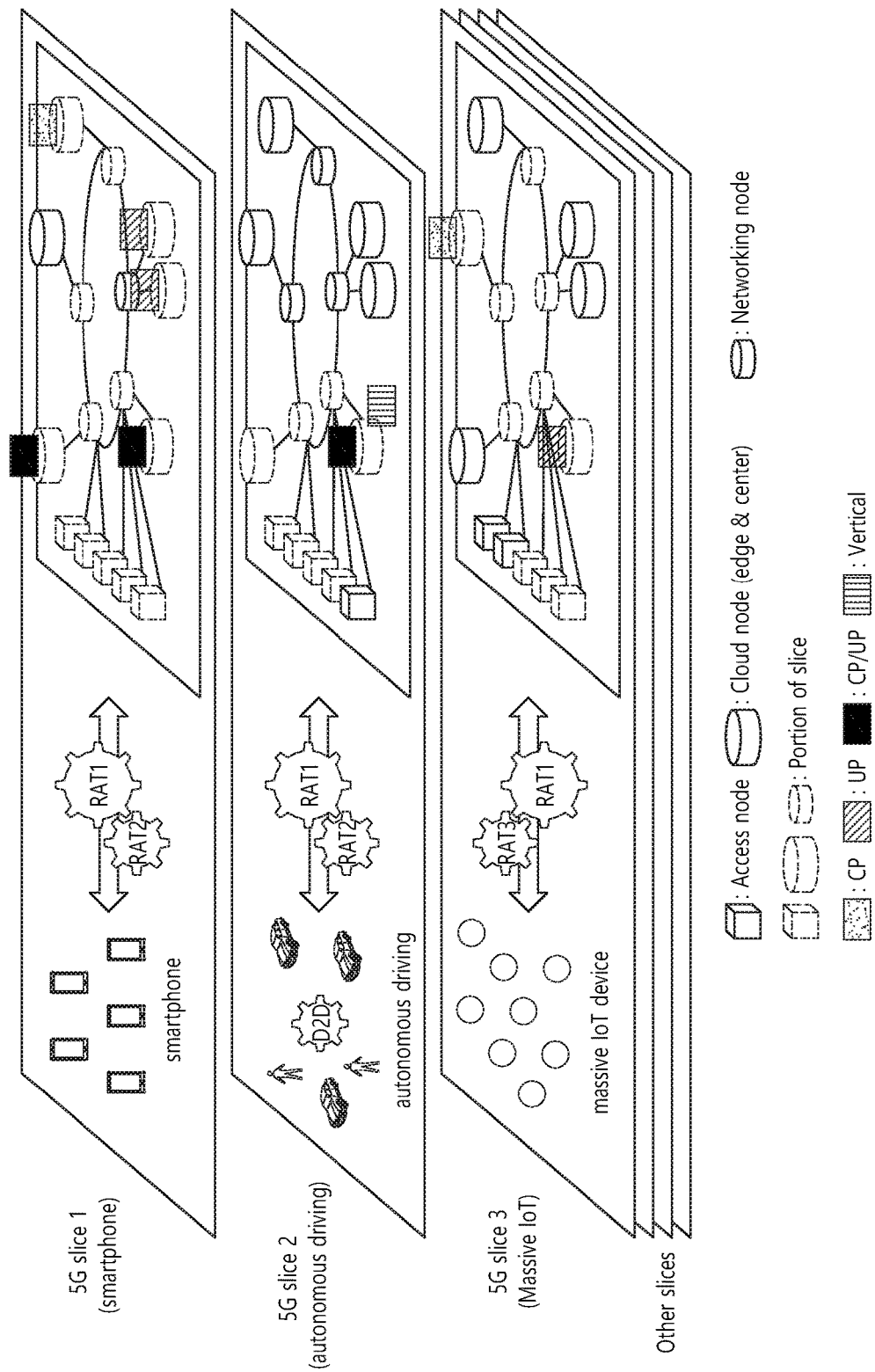
FIG. 8 shows an example of network slicing.

FIG. 8 shows an example of network slicing.

Referring to FIG. 8, one physical network may be sliced into logical networks, such as slice 1 for supporting a smartphone, slice 2 for supporting autonomous driving, slice 3 for supporting massive IOT, and other slices for supporting other services. Thus, for example, when the network receives a request for autonomous driving, slice 2 may be selected.

Each slice is assured of a resource (e.g., a resource in a virtualized server and a virtualized network resource). Further, since the slices are isolated from each other, an error or a failure that occurs in a particular slice does not affect communication in a different slice. For example, even though a failure occurs in slice 1 for supporting a smartphone, the failure occurring in slice 1 does not affect the other slices, and thus an autonomous driving service and a massive IoT service may be normally performed.

In the related art, a cell broadcasts system information only relevant to a cell operation. Thus, a UE applies a system information acquisition procedure after the completion of a handover, after entering E-UTRA from another RAT, upon return to coverage, upon reselecting a cell, or upon selecting a cell (e.g., upon power-on). However, when BSs are hierarchically deployed, it is necessary to propose an improved system information acquisition procedure. Hereinafter, a method for acquiring system information and an apparatus for supporting the same will be described according to an embodiment of the present invention.

Figure 9:
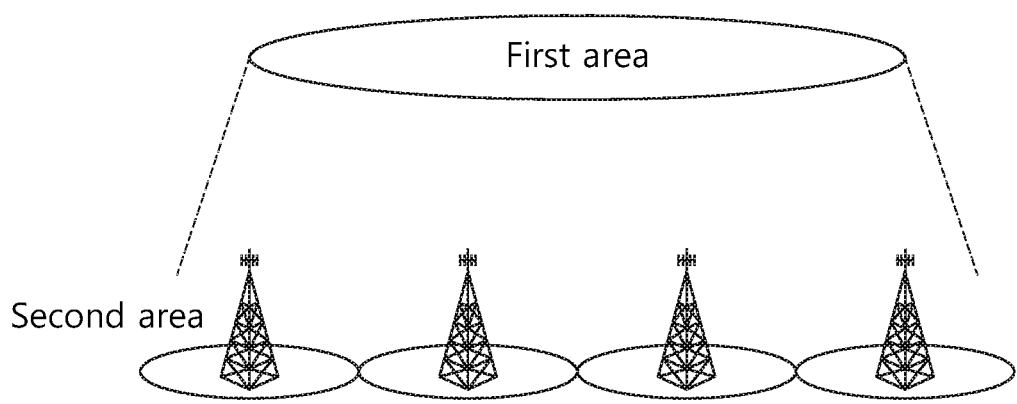
FIG. 9 illustrates a scenario in which BSs are hierarchically deployed according to an embodiment of the present invention.

FIG. 9 illustrates a scenario in which BSs are hierarchically deployed according to an embodiment of the present invention.

Referring to FIG. 9, a first area may include one or more second areas. The first area may be an area served by a first BS, and the one or more second areas may be areas served respectively by one or more second BSs. For example, the first BS may be a central unit (CU), and the second BS may be a distributed unit (DU). In this case, the first area may be an area served by a CU, and the one or more second areas may be areas served respectively by one or more DUs. In this specification, a DU and a remote unit (RU) may be used to refer to the same concept.

According to an embodiment of the present invention, two types of system information may be newly defined.

For example, the two types of system information may be first area-specific system information and second area-specific system information. The first area-specific system information may be system information provided by a first BS, and the second area-specific system information may be system information transmitted by a second BS. A UE may receive the first area-specific system information provided by the first BS from the second BS. The first area-specific system information and the second area-specific system information may be broadcast in different time subframes (i.e., different time resources). The first area-specific system information and the second area-specific system information may be broadcast at different frequencies (i.e., different frequency resources or different subbands). The first area-specific system information may be transmitted via synchronous transmissions over different second areas belonging to the same first area. The second area-specific system information may be transmitted respectively by one or more second BSs.

For example, the two types of system information may be CU area-specific system information and DU area-specific system information. The CU area-specific system information may be system information provided by a CU, and the DU area-specific system information may be system information transmitted by a DU. A UE may receive the CU area-specific system information provided by the CU from the DU. The CU area-specific system information and the DU area-specific system information may be broadcast in different time subframes (i.e., different time resources). The CU area-specific system information and the DU area-specific system information may be broadcast at different frequencies (i.e., different frequency resources or different subbands). The CU area-specific system information may be transmitted via synchronous transmissions over different DU areas belonging to the same CU area. The DU area-specific system information may be transmitted respectively by one or more DUs.

Hereinafter, for the convenience of explanation, although a system information acquisition procedure and a system information change notification procedure are described based on a scenario in which a CU and one or more DUs are hierarchically deployed, the technical idea of the present invention is not limited to a scenario in which a CU and one or more DUs are hierarchically deployed. The system information acquisition procedure and the system information change notification procedure proposed below may be applied to various scenarios in which cells or BSs are hierarchically deployed.

<System Information Acquisition Procedure>

When a UE enters a particular CU area, the UE may acquire all required system information. That is, when the UE enters the particular CU area, the UE may acquire not only CU area-specific system information for the particular CU area but also DU area-specific system information. The DU area-specific system information may be transmitted from a DU area where the UE is located.

When the UE moves from the particular CU area to another CU area, the UE may newly acquire CU area-specific system information and DU area-specific system information from the new CU area. The CU area-specific system information and the DU area-specific system information may be transmitted from a DU area to which the UE belongs.

The UE may detect whether the CU area has been changed based on an identifier included in the DU area-specific system information. The identifier may be a CU identifier including information on the CU area. The CU identifier may be present as part of a DU identifier in the DU area-specific system information. Alternatively, the CU identifier may be explicitly present in the DU area-specific system information.

When the UE moves to a different DU area within the particular CU area, the UE needs to newly acquire only DU area-specific system information. The UE needs to retain the CU area-specific system information. In this case, the UE is not required to newly acquire the CU area-specific system information.

The UE may move to another area through various procedures, such as a handover, redirection, or cell reselection.

Figure 10:
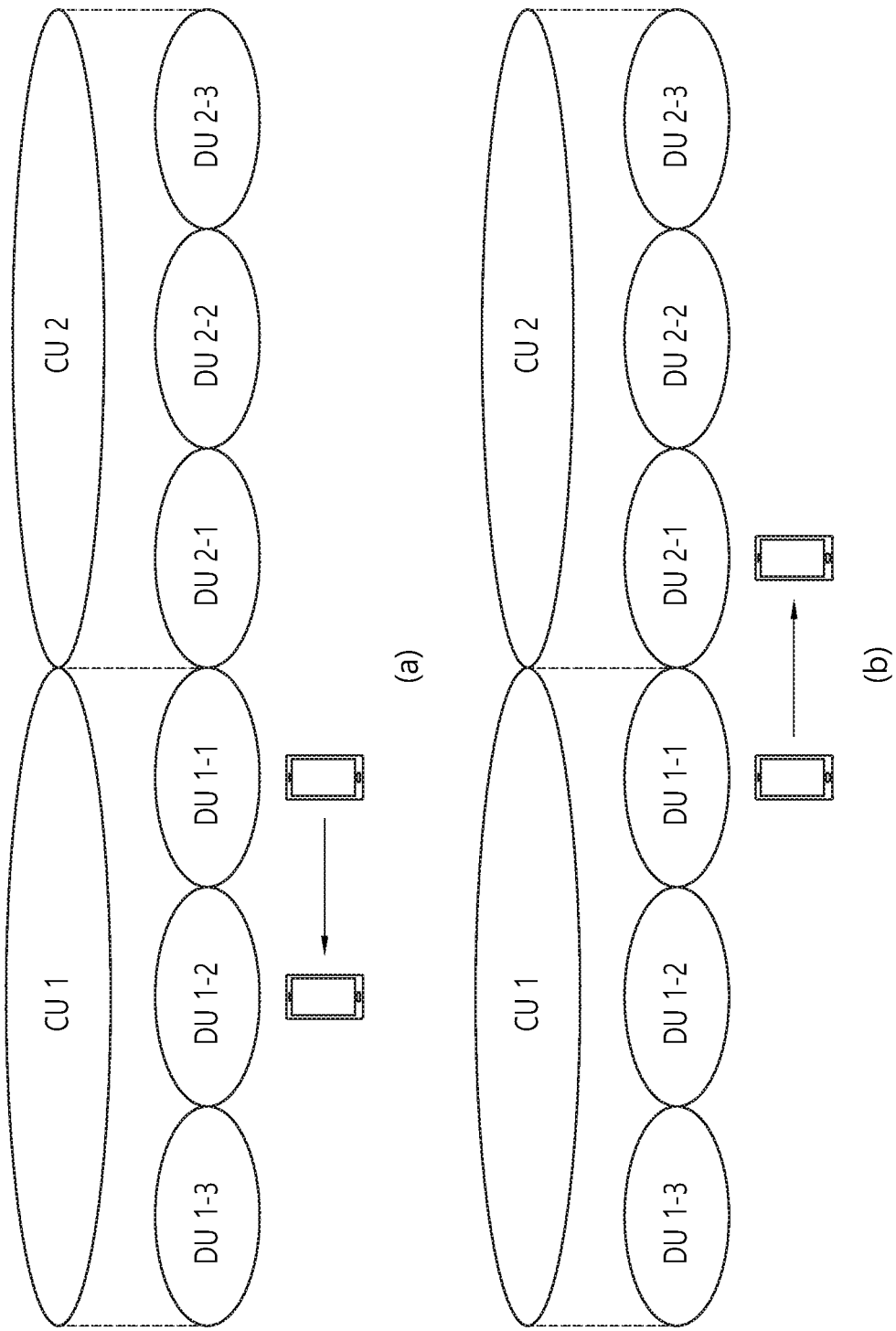
FIG. 10 illustrates a procedure in which a UE acquires system information according to an embodiment of the present invention.

FIG. 10 illustrates a procedure in which a UE acquires system information according to an embodiment of the present invention.

Referring to FIG. 10, CU 1 may include DU 1-1, DU 1-2, and DU 1-3, and CU 2 may include DU 2-1, DU 2-2, and DU 2-3. It is assumed that a UE is located in a CU 1 area and a DU 1-1 area.

The UE may acquire both system information for CU 1 and system information for DU 1-1. The UE may acquire the system information for DU 1-1 from DU 1-1. The system information for DU 1-1 may include an identifier indicating CU 1. The UE may acquire the system information for CU 1 from DU 1-1. Alternatively, the UE may acquire the system information for CU 1 via synchronous transmissions from DU 1-1, DU 1-2, and DU 1-3.

Referring to (a) of FIG. 10, it is assumed that the UE moves to a DU 1-2 area. Then, the UE may acquire system information for DU 1-2. The system information for DU 1-2 may include an identifier indicating CU 1. The UE may detect whether a CU area has been changed based on the identifier included in the system information for DU 1-2 and the identifier included in the system information for DU 1-1. Since all of the system information for DU 1-1 and the system information for DU 1-2 include the identifier indicating CU 1, the UE may detect that the CU area has not been changed. Accordingly, the UE may maintain the system information for CU 1. That is, according to the embodiment in (a) of FIG. 10, the UE moving from the DU 1-1 area to the DU 1-2 area may maintain the system information for CU 1 and may newly acquire only the system information for DU 1-2.

Referring to (b) of FIG. 10, it is assumed that the UE moves to a DU 2-1 area. Then, the UE may acquire system information for DU 2-1. The system information for DU 2-1 may include an identifier indicating CU 2. The UE may detect whether the CU area has been changed based on the identifier included in the system information for DU 2-1 and the identifier included in the system information for DU 1-1. The system information for DU 1-1 includes the identifier indicating CU 1, while the system information for DU 2-1 includes the identifier indicating CU 2, and thus the UE may detect that the CU area has been changed. Therefore, the UE may newly acquire system information for CU 2. That is, according to the embodiment in (b) of FIG. 10, the UE moving from the DU 1-1 area to the DU 2-1 area may newly acquire both the system information for CU 2 and the system information for DU 2-1.

<System Information Change Notification Procedure>

(1) Notification of Change of System Information Based on Value Tag

A Value Tag for CU area-specific system information and a Value Tag for DU area-specific system information may be newly defined. The acquisition of system information for CU area-specific system information or DU area-specific system information by a UE may be performed according to the Value Tag of each type.

When a stored Value Tag for CU area-specific system information is different from a broadcast Value Tag for CU area-specific system information, the UE may newly acquire CU area-specific system information from the current RU area.

When a store Value Tag for RU area-specific system information is different from a broadcast Value Tag for RU area-specific system information, the UE may newly acquire RU area-specific system information from the current RU area.

A Value Tag for CU area-specific system information may be present in any one of a plurality of pieces of CU area-specific system information, while a Value Tag for RU area-specific system information may be present in any one of a plurality of pieces of RU area-specific system information. In addition, the Value Tag for CU area-specific system information or the Value Tag for RU area-specific system information may be present in a paging message.

(2) Notification of Change of System Information Based on Indication of Downlink Message For example, a downlink message may be a paging message. When an indication corresponding to CU area-specific system information is present in the paging message, a UE may newly acquire CU area-specific system information. On the other hand, when an indication corresponding to RU area-specific system information is present in the paging message, the UE may newly acquire RU area-specific system information.

Figure 11:
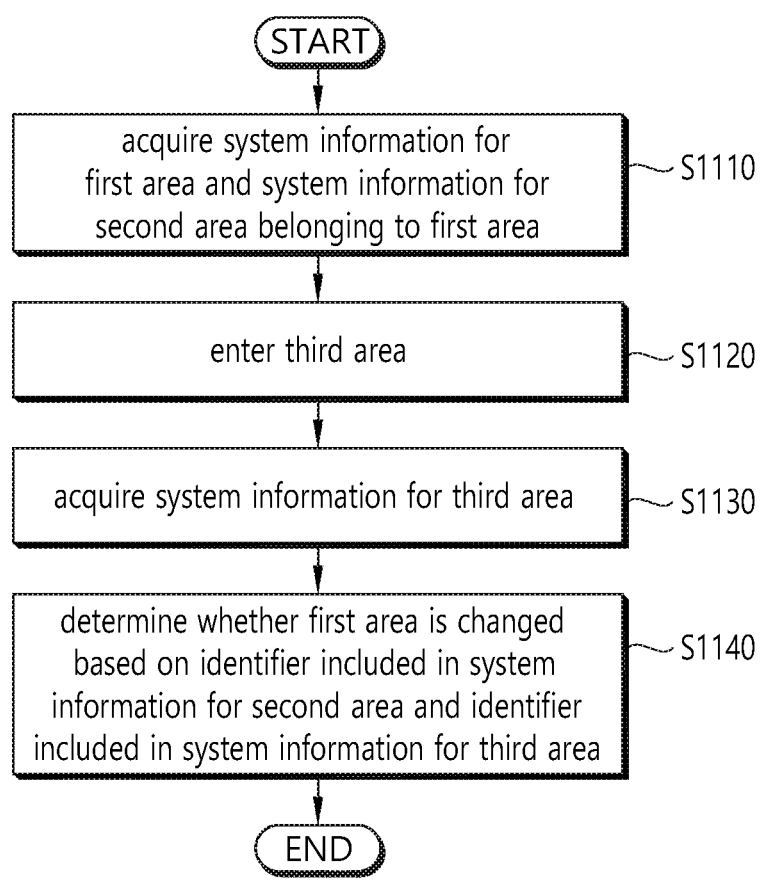
FIG. 11 is a block diagram illustrating a method in which a UE acquires system information according to an embodiment of the present invention.

FIG. 11 is a block diagram illustrating a method in which a UE acquires system information according to an embodiment of the present invention.

Referring to FIG. 11, in step S1110, the UE may acquire system information for a first area and system information for a second area belonging to the first area. The system information for the first area and the system information for the second area may be broadcast via different time resources or different frequency resources. The system information for the first area and the system information for the second area belonging to the first area may be acquired from the second area.

In step S1120, the UE may enter a third area. The UE may enter the third area by any one of handover, redirection, and cell reselection.

In step S1130, the UE may acquire system information for the third area.

In step S1140, the UE may determine whether the first area is changed based on an identifier included in the system information for the second area and an identifier included in the system information for the third area.

When it is determined that the first area is changed, the UE may acquire system information for the changed first area. In this case, the first area may be an area covered by a central unit (CU) of a first next-generation NodeB (gNB), the changed first area may be an area covered by a CU of a second gNB, the second area may be an area covered by a distributed unit (DU) of the first gNB, and the third area may be an area covered by a DU of the second gNB. The CU may perform an upper-layer function of a BS, and the DU may perform a lower-layer function of the BS.

When it is determined that the first area is not changed, the UE may keep the system information for the first area. The first area may be an area covered by a CU of a first gNB, and the second area and the third area may be areas covered by a DU of the first gNB.

Further, the UE may determine whether the system information for the first area or the system information for the second area is changed based on a Value Tag. Alternatively, the UE may determine whether to newly acquire the system information for the first area or the system information for the second area based on an indication included in a paging message.

Figure 12:
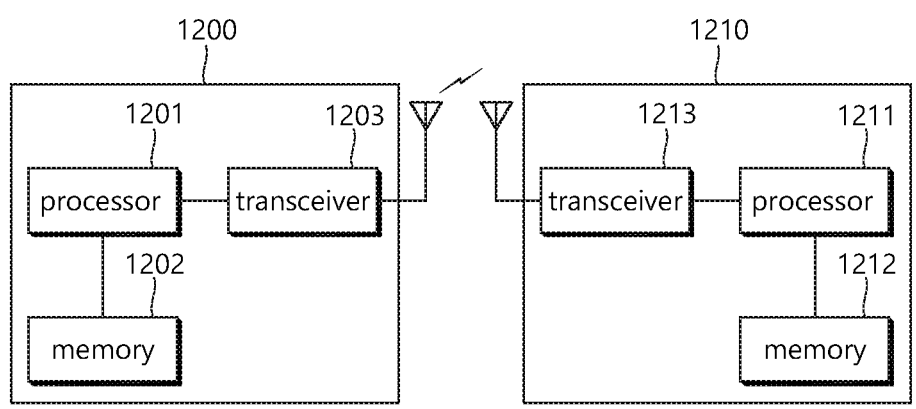
FIG. 12 is a block diagram illustrating a wireless communication system according to the embodiment of the present invention.

FIG. 12 is a block diagram illustrating a wireless communication system according to the embodiment of the present invention.

A BS 1200 includes a processor 1201, a memory 1202 and a transceiver 1203. The memory 1202 is connected to the processor 1201, and stores various types of information for driving the processor 1201. The transceiver 1203 is connected to the processor 1201, and transmits and/or receives radio signals. The processor 1201 implements proposed functions, processes and/or methods. In the above embodiment, an operation of the base station may be implemented by the processor 1201.

A UE 1210 includes a processor 1211, a memory 1212 and a transceiver 1213. The memory 1212 is connected to the processor 1211, and stores various types of information for driving the processor 1211. The transceiver 1213 is connected to the processor 1211, and transmits and/or receives radio signals. The processor 1211 implements proposed functions, processes and/or methods. In the above embodiment, an operation of the UE may be implemented by the processor 1211.

The processor may include an application-specific integrated circuit (ASIC), a separate chipset, a logic circuit, and/or a data processing unit. The memory may include a read-only memory (ROM), a random access memory (RAM), a flash memory, a memory card, a storage medium, and/or other equivalent storage devices. The transceiver may include a base-band circuit for processing a wireless signal. When the embodiment is implemented in software, the aforementioned methods can be implemented with a module (i.e., process, function, etc.) for performing the aforementioned functions. The module may be stored in the memory and may be performed by the processor. The memory may be located inside or outside the processor, and may be coupled to the processor by using various well-known means.

Various methods based on the present specification have been described by referring to drawings and reference numerals given in the drawings based on the aforementioned examples. Although each method describes multiple steps or blocks in a specific order for convenience of explanation, the invention disclosed in the claims is not limited to the order of the steps or blocks, and each step or block can be implemented in a different order, or can be performed simultaneously with other steps or blocks. In addition, those ordinarily skilled in the art can know that the invention is not limited to each of the steps or blocks, and at least one different step can be added or deleted without departing from the scope and spirit of the invention.

The aforementioned embodiment includes various examples. It should be noted that those ordinarily skilled in the art know that all possible combinations of examples cannot be explained, and also know that various combinations can be derived from the technique of the present specification. Therefore, the protection scope of the invention should be determined by combining various examples described in the detailed explanation, without departing from the scope of the following claims.

What is claimed is:

1. A method for acquiring, by a user equipment (UE), system information in a wireless communication system, the method comprising:
   acquiring system information for a first area and system information for a second area belonging to the first area;
   upon entering a third area, acquiring system information for the third area; and
   determining whether the first area is changed, based on an identifier related to the first area and an identifier comprised in the system information for the third area,
   wherein the identifier related to the first area is obtained based on an identifier related to the second area comprised in the system information for the second area,
   wherein the system information for the first area and the system information for the second area are broadcast via different time resources or different frequency resources,
   wherein the first area is an area covered by a central unit (CU) of a first next-generation NodeB (gNB), the second area is an area covered by a distributed unit (DU) of the first gNB, and
   wherein the CU performs an upper-layer function of a BS, and the DU performs a lower-layer function of the BS.

2. The method of claim 1, further comprising:
   acquiring system information for the changed first area when it is determined that the first area is changed,
   wherein the changed first area is an area covered by a CU of a second gNB, and
   wherein the third area is an area covered by a DU of the second gNB.

3. The method of claim 1, further comprising:
   keeping the system information for the first area when it is determined that the first area is not changed,
   wherein the third area is covered by a DU of the first gNB.

4. The method of claim 1, wherein the system information for the first area and the system information for the second area belonging to the first area are acquired from the second area.

5. The method of claim 1, wherein the UE enters the third area by at least one of handover, redirection, or cell reselection.

6. The method of claim 1, further comprising:
   determining whether the system information for the first area or the system information for the second area is changed based on a Value Tag.

7. The method of claim 1, further comprising:
   determining whether to newly acquire the system information for the first area or the system information for the second area based on an indication comprised in a paging message.

8. A user equipment (UE) for acquiring system information in a wireless communication system, the UE comprising:
   a memory;
   a transceiver; and
   a processor to connect the memory and the transceiver, wherein the processor is configured to:
   acquire system information for a first area and system information for a second area belonging to the first area;

upon entering a third area, acquire system information for the third area; and determine whether the first area is changed based on an identifier related to the first area and an identifier comprised in the system information for the third area, wherein the identifier related to the first area is obtained based on an identifier related to the second area comprised in the system information for the second area, wherein the system information for the first area and the system information for the second area are broadcast via different time resources or different frequency resources, wherein the first area is an area covered by a central unit (CU) of a first next-generation NodeB (gNB), the second area is an area covered by a distributed unit (DU) of the first gNB, and wherein the CU performs an upper-layer function of a BS, and the DU performs a lower-layer function of the BS.

9. The UE of claim 8, wherein the processor is configured to acquire system information for the changed first area when it is determined that the first area is changed, wherein the changed first area is an area covered by a CU of a second gNB, and wherein the third area is an area covered by a DU of the second gNB.

* * * * *